July 6, 1954
C. I. LEVEKE
2,682,927
SUSPENSION FOR TREAD SUPPORTING WHEELS
OF ENDLESS TREAD VEHICLES
Filed Oct. 20, 1951
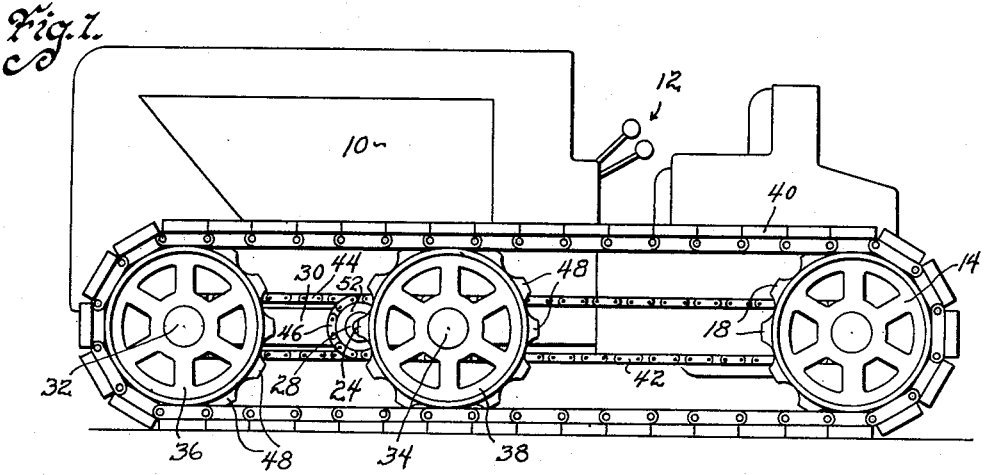
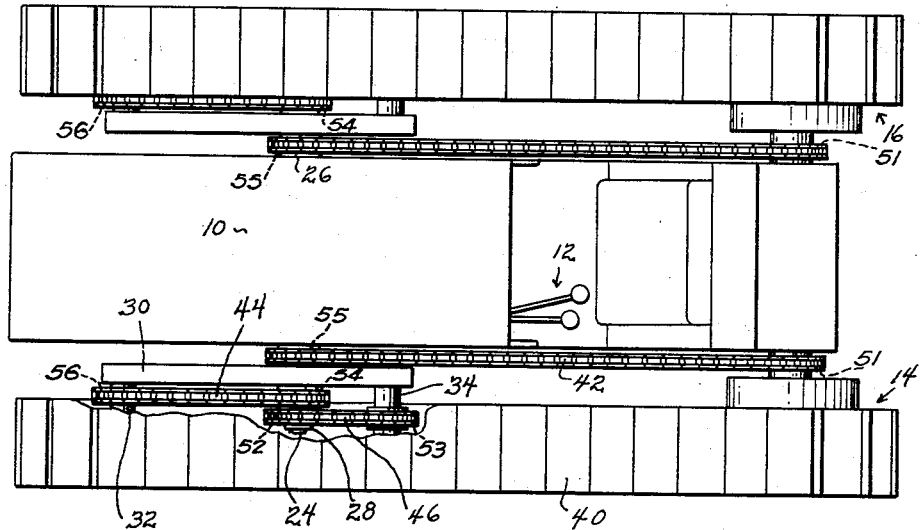
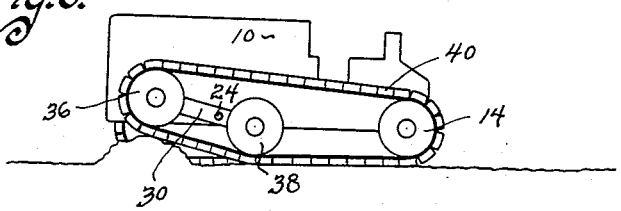
Inventor
Chester I. Leveke
by M. Talbert Dick
Attorney
Witness
Edward P. Seeley Patented July 6, 1954

2,682,927

UNITED STATES PATENT OFFICE 2,682,927

SUSPENSION FOR TREAD SUPPORTING WHEELS OF ENDLESS TREAD VEHICLES

Chester I. Leveke, Des Moines, Iowa

Application October 20, 1951, Serial No. 252,253

1 Claim. (Cl. 180—9.1)

My invention is a novel suspension for endless tread vehicle tread supporting wheels or at least some of said wheels.

To my knowledge, commercial crawling or endless tread type vehicles have always had one large wheel at each end of the vehicle with smaller idler or bogey wheels or a slide of some nature supporting the tread in between the main large wheels. Such units tend to plow into abrupt barriers of soft earth or the like and expend considerable power in this manner. This is particularly true in crossing ditches or the like. Many military vehicles are similarly constructed. There are, however, military vehicles with a small bogey wheel arranged at an elevation in front of the forward large wheel. This construction provides the vehicle with an upwardly slanting forward portion of the track. When the front of the tread slants upwardly, there is seldom an opportunity for the vehicle to plow into the earth as the slanting forward portion strikes the obstacle with a broad supporting surface that will cause the vehicle to ride over the top of the obstacle. Although this slanting forward end is valuable in getting over abrupt obstacles, it is a total loss in normal operation over relatively flat ground. Furthermore, the weight of this slanting forward end hangs out over the front of the machine which is generally an undesirable place to have excess weight. Hence certain disadvantages must be put up with to gain the advantage of climbing abrupt soft banks with equipment known before my invention.

In every case of endless tread vehicles, surmounting barriers, however, whether they plow through for a time and finally climb the obstacle or whether they are of the type mentioned that immediately climbs on top of the obstruction, the vehicle tips considerably if only one track encounters an obstacle or the front end of the device tilts up sharply if both tracks engage the barrier. This tipping of the vehicle is disadvantageous in many instances. In commercial use, a crawling type tractor equipped with a grading blade to make a bulldozer requires considerable manipulation of the blade as the tracks run over uneven ground. Since the dozer blade extends considerably past the front of the device, a small amount of variation in the tracks causes a considerable amount of variation in the position of the blade relative to the ground. In military vehicles such as self-propelled guns and tanks, this tipping tends to interfere with accurate aiming of the gun or guns. Of course, such developments as the new automatically stabilized gun mount aids in overcoming this difficulty but it is not without its limitations. The amount of correction possible with the automatic mount is limited in addition to the fact that sudden and violent correction of the gun position relative to the vehicle is hazardous to the gun crew on the vehicle. Also the less correction required of the automatic mount, the more rapid and accurate its correction. My new suspension gives the advantages of the slanting forward end without its drawbacks. My new tread suspension also reduces the amount of variation of a bulldozer blade resulting from the lifting of the forward end of the vehicle.

In view of the foregoing, it is the principal object of my invention to provide an endless tread mount that permits an endless tread vehicle to surmount abrupt barriers with a minimum of effort.

It is a further object of my invention to provide an endless tread mount that permits the vehicle to surmount obstacles with a minimum of vertical movement of the vehicle.

It is a further object of my invention to provide an endless tread mount that operates with efficiency regardless of the character of the terrain over which the vehicle is operated.

It is a further object of my invention to provide an endless tread mount that provides increased maneuverability for the vehicle equipped with it.

It is a further object of my invention to provide an endless tread mount that will accomplish all the foregoing objects and yet which is adapted to having all the main wheels driven or powered.

It is a still further object of my invention to provide an endless tread mount that permits a shorter vehicle tread to be used on vehicles operated over rough terrain.

It is yet a further object of my invention to provide an endless tread mount that permits improved balance characteristics for vehicles using it.

It is another object of my invention to provide an endless tread mount that permits the use of smaller wheels to support and drive the endless tread than would otherwise be practical.

These and other objects will be apparent to those skilled in the art.

My invention consists in the construction, arrangement, and combination of the various parts of the device, whereby the objects contemplated are attained as hereinafter more fully set forth, pointed out in my claim, and illustrated in the accompanying drawings, in which:

Fig. 1 is a side view of an endless tread vehicle employing my new mount,

Fig. 2 is a top view of an endless tread vehicle employing my new mount. A portion of the vehicle is broken away to more fully illustrate the construction of the mount, and Fig. 3 is a reduced diagrammatic side view of an endless tread vehicle equipped with any tread mount and with one tread encountering and surmounting an obstacle.

Referring to the drawings, I have used the numeral 10 to designate an ordinary endless tread vehicle with the usual controls 12 and having separately clutched rear wheels 14 and 16. The rear wheels are supplied with tread gripping members 18. Ordinary sprocket wheels 51 are fixed to and rotate with the wheels 14 and 16. Near the forward end of the vehicle on each side is a stub shaft, one designated 24 and the other 26. As the structure supported on one of the stub shafts is substantially identical with that on the other, only one will be described in detail, it being understood that the other is a substantial duplicate of the one for which a description is given. On stub shaft 24 is rotatably secured a hollow sprocket wheel supporting shaft designated 28. A third ordinary sprocket wheel 55 is fixed to shaft 28 so that it aligns with the sprocket wheel 51 fixed to the corresponding rear wheel. Sprocket wheel 55 turns the shaft whenever it is rotated. Two more sprocket wheels 54 and 52 are fixed to the outer end of the shaft 28 so that they rotate whenever the shaft 28 rotates. Pivoted on the shaft 28 between the dual sprocket wheels and the single sprocket wheel is a tandem axle frame or bar designated 30. Each end of bar 30 carries an axle shaft, the front one designated 32 and the back one 34. The axle 32 is positioned farther from shaft 28 than axle 34 is. This distance differential may vary depending upon the results to be achieved. As the forward axle is positioned farther from the stub shaft, or the back one closer; the more weight supported by stub shaft 26 tends to bear on axle 34 as compared to the weight carried by axle 32. In the instant drawings I have shown the axle 32 as being twice as far from shaft 28 as is axle 34. Each of the axles rotatably supports a wheel, the one on axle 32 being designated 36 and the one on axle 34 being designated 38. By reason of the positions of the axles on the tandem frame relative to its point of hinged mounting to the frame of the vehicle via shaft 28 and stub shaft 24, the wheel 36 supports only one-third of the weight imposed on stub shaft 24 while wheel 38 carries two-thirds of the weight placed on the same stub shaft. By this arrangement of the front wheels, the front of the endless tread 40 will tip up to form a slanting forward end the instant the tread encounters a barrier. Furthermore, the attitude of the vehicle is altered very little as the tread moves relative to the vehicle as shown in Fig. 3. This wheel suspension or mounting for the forward end of the tread may also be used on the rear wheels that support the endless tread. My new mount is most advantageous when used on the front, however, as far as non-military uses for the vehicle equipped with my mount. On military vehicles of the endless tread type such as tanks and the like, this suspension could be used on all four points of weight distribution instead of merely on the front suspension. If four tandem axle frames comparable to element 30 were used, it would be imperative to develop a drive for at least some of the tandem wheels. I have illustrated a means for driving the front as well as the back wheels of the vehicle illustrated in the drawings and which is applicable in principle to a vehicle with the tandem arrangement front and rear. This drive I will now describe.

The sprocket wheel shaft 28 and the sprocket wheels secured thereto have already been described and the sprocket wheel secured to the wheel 14 as well. A chain designated 42 is reeved over the single sprocket wheel 55 on shaft 28 and the one on wheel 14 to positively associate them for rotation in unison. As the shaft 28 is journaled on stub shaft 24, it is undisturbed by pivoting action of frame 30. The wheel 36 has a sprocket wheel 56 secured to it and the wheel 38 carries sprocket wheel 53. The chains 44 and 46 connect the last two mentioned sprocket wheels respectively to the corresponding one of dual sprocket wheels on shaft 28 as shown in Fig. 2. Because the sprocket wheels that are operatively associated by chains 44 and 46 are fixed in relation to each other as to lineal movement, there is no change in chain tension as the tandem wheels pivot. The wheels 36 and 38 are provided with means for engaging the tread 40 with a driving grip by the teeth 48. It is necessary to have each pair of sprocket wheels over which a chain is reeved of such a size that the end product of the drive system is to have the speed of the front and rear wheels the same. The easiest way to accomplish this, of course, is to have all the sprocket wheels of the same size so that there is no need to calculate gear ratios. I have shown the chains as the driving means for the tandem wheels, because they are easily illustrated. It is clear that other driving means could be used. If the rear wheels were tandem and powered, the sprocket wheels that are connected to the wheels could be mounted directly on the powered rear axle.

The advantages of my new tread mount are several. In the first place, the crawling vehicle will climb over obstacles very easily and with a minimum loss of power since the forward end of the tread that has a relatively light weight load on it will yield upwardly to the barrier. On the straight and level, however, the whole tread of the vehicle contacts the ground surface and is effective, therefore, in providing traction. Furthermore, this barrier climbing ability does not interfere with having the weight of the vehicle squarely balanced over the tread rather than having a portion of the vehicle extending forwardly of the tread as is true of certain military vehicles as pointed out above. Also, of course, the wheels 36, 38 and 14 may be considerably smaller than would be true if my tandem axle were not used. Without my tandem axle, the climbing ability of the device would be seriously impaired if the front wheel were small. However, with my mount being used, the entire forward end of the tread tips up to provide the same advantage in climbing barriers that results from using a very large front wheel or a slanting forward portion of the tread. Because of the movement of the wheels 36 and 38 in overcoming a barrier, the forward end of the vehicle is not moved vertically as much as the usual crawling type vehicle. When my tandem mount is used, therefore, a bulldozer blade does not require as much adjustment to hold a constant position as is true with the blade mounted on the ordinary crawling or endless tread vehicle.

I have found also that this unusual wheel mount of mine provides a pivot point for turns near the center of the vehicle. The usual endless tread vehicle tends to turn on its rear wheels. It is difficult, therefore, to maneuver the vehicle toward a barrier and execute a turn that will cause the vehicle to be parallel to the barrier and near to it. With the usual crawling traction tractor, a series of partial turns and alternate forward movement of the tractor is necessary. A tractor equipped with my tandem front wheels, however, pivots on the wheel 38 and its corresponding wheel on the other side and this is so whether the ground is level or uneven. The reason for this center wheel pivoting is that the center wheel carries a majority of the weight of the machine. It follows that the machine is highly maneuverable and will spin in its own length if necessary.

In conclusion it should be made unavoidably clear that the action of the tandem front wheels does not depend on power being applied to them. They will operate to "step over" obstacles whether they are driven or not.

Some changes may be made in the construction and arrangement of my endless tread mount without departing from the real spirit and purpose of my invention, and it is my intention to cover by my claim, any modified forms of structure or use of mechanical equivalents which may be reasonably included within its scope.

I claim:

In combination, an automotive vehicle having a source of power and a frame, a shaft rigidly secured to the forward side of said frame and extending laterally therefrom, a bar frame parallel of said vehicle and pivoted on said shaft at a point between its two ends and capable of vertical rocking movement; said pivot point of said bar frame being twice as close to the rear end of said bar frame as it is to the forward end of said bar frame, a wheel rotatably mounted at each end of said bar frame; said two wheels being of the same size and arranged in tandem to rotate parallel of said vehicle, a third wheel rotatably secured to the rear side portion of said frame of said vehicle, in tandem to said first two wheels, the same size as each of said two wheels, and adapted to be connected to the source of power of said vehicle, an endless tread embracing all three of said wheels, a sprocket wheel operatively connected to said third wheel, a sprocket wheel operatively rotatably mounted on said shaft, an endless chain embracing said last two sprocket wheels, a sprocket wheel secured to each of said two first mentioned wheels, two sprocket wheels operatively rotatably mounted on said shaft and operatively connected to the first mentioned sprocket wheel that is operatively rotatably mounted on said shaft, an endless chain embracing one of said two sprocket wheels on said shaft and the sprocket wheel of one of the first two mentioned wheels, an endless chain embracing the other of said two sprocket wheels on said shaft and the sprocket wheel of the other first two mentioned wheels, whereby said two drive sprocket wheels on said shaft will be concentric with the pivot point of said bar frame and all three of said track wheels will be powered regardless of the vertical position of one of the two front wheels relative to the other.

References Cited in the file of this patent

UNITED STATES PATENTS

| Number | Name | Date |
|---|---|---|
| 814,780 | Grosshauser | Mar. 13, 1906 |
| 1,112,460 | Leavitt | Oct. 6, 1914 |
| 1,288,538 | Ellis | Dec. 24, 1918 |
| 1,629,079 | Knox | May 17, 1927 |
| 1,653,156 | Ebel | Dec. 20, 1927 |
| 1,862,934 | Knox | June 14, 1932 |

FOREIGN PATENTS

| Number | Country | Date |
|---|---|---|
| 37,381 | Sweden | Aug. 12, 1914 |
| 45,079 | Denmark | Jan. 4, 1932 |